us007570719B2

(12) United States Patent
Sundaralingam (10) Patent No.: US 7,570,719 B2
(45) Date of Patent: Aug. 4, 2009

(54) RECEIVER AND A RECEIVING METHOD (75) Inventor: Sathiaseelan Sundaralingam, Camberley (GB)

(73) Assignee: Nokia Siemens Networks Oy, Espoo (FI)

( * ) Notice: Subject to any disclaimer, the term of this patent is extended or adjusted under 35 U.S.C. 154(b) by 691 days.

(21) Appl. No.: 10/492,914

(22) PCT Filed: Oct. 15, 2002

(86) PCT No.: PCT/IB02/04253

§ 371 (c)(1),
(2), (4) Date: May 13, 2004

(87) PCT Pub. No.: WO03/039025

PCT Pub. Date: May 8, 2003

(65) Prior Publication Data

US 2004/0252789 A1    Dec. 16, 2004

(30) Foreign Application Priority Data

Oct. 17, 2001   (GB) ................................ 0124952.3

(51) Int. Cl.
*H03D 3/00* (2006.01)
(52) U.S. Cl. .................................................... 375/336
(58) Field of Classification Search ................. 375/336
See application file for complete search history.

(56) References Cited

U.S. PATENT DOCUMENTS

| 5,848,105 | A | * | 12/1998 | Gardner et al. ............... 375/336 |
| 5,949,828 | A | * | 9/1999 | Izumi .......................... 375/326 |
| 5,953,323 | A | * | 9/1999 | Haartsen ...................... 370/330 |
| 5,995,499 | A | * | 11/1999 | Hottinen et al. ............. 370/337 |
| 5,995,572 | A |   | 11/1999 | Dettmar |
| 6,020,962 | A | * | 2/2000 | Curbelo ....................... 356/451 |
| 6,026,130 | A | * | 2/2000 | Rahmatullah et al. ........ 375/340 |
| 6,097,770 | A |   | 8/2000 | Bahai et al. |
| 6,148,023 | A | * | 11/2000 | Pelin et al. ................... 375/130 |
| 6,263,029 | B1 |  | 7/2001 | Alard et al. |

(Continued)

FOREIGN PATENT DOCUMENTS

EP   0 966 113 A1   12/1999

(Continued)

OTHER PUBLICATIONS

Kambiz Zangi, et al., "Physical-Layer Issues for Deploying Transmit Diversity in GPRS/EGPRS Networks," VTC Fall 2001, IEEE, 2001, pp. 538-542.

(Continued)

*Primary Examiner*—David C Payne
*Assistant Examiner*—Nader Bolourchi
(74) *Attorney, Agent, or Firm*—Squire, Sanders & Dempsey, LLP (57) ABSTRACT

A receiver for receives transmitted signals and each transmitted signal contains at least two known portions which are spaced from one another in the signal and at least one other portion. The receiver comprises channel estimation means for estimating a channel based on at least one of the known portions, and means for using the channel estimate and at least two of the known portions to determine a characteristic of the channel.

25 Claims, 6 Drawing Sheets

U.S. PATENT DOCUMENTS

| | | | |
|---|---|---|---|
| 6,522,696 B1 * | 2/2003 | Mobin et al. | 375/262 |
| 6,639,937 B2 * | 10/2003 | Doetsch et al. | 375/130 |
| 6,944,206 B1 * | 9/2005 | Dent | 375/144 |
| 6,952,570 B2 * | 10/2005 | Nagayasu | 455/208 |
| 6,956,893 B2 * | 10/2005 | Frank et al. | 375/147 |
| 7,050,419 B2 * | 5/2006 | Azenkot et al. | 370/347 |
| 7,149,266 B1 * | 12/2006 | Imamura et al. | 375/355 |
| 2002/0110184 A1 * | 8/2002 | Akopian et al. | 375/149 |
| 2002/0181615 A1 * | 12/2002 | Kuzminskiy et al. | 375/316 |
| 2003/0043768 A1 * | 3/2003 | Chang et al. | 370/335 |
| 2003/0045257 A1 * | 3/2003 | Kobayashi et al. | 455/234.1 |
| 2003/0048838 A1 * | 3/2003 | Sexton et al. | 375/229 |
| 2003/0147456 A1 * | 8/2003 | Kumura | 375/148 |

FOREIGN PATENT DOCUMENTS

| | | |
|---|---|---|
| EP | 1 052 820 A1 | 11/2000 |
| WO | WO 98/57441 | 12/1998 |
| WO | WO 00/54431 | 9/2000 |
| WO | WO 01/01646 A1 | 1/2001 |

OTHER PUBLICATIONS

European Office Action, Application No. 02 802 338.0-2415, Date Office Action Issued: Aug. 6, 2008, pp. 1-5.

* cited by examiner

RECEIVER AND A RECEIVING METHOD

FIELD OF THE PRESENT INVENTION

The present invention relates to a receiver and a method of receiving. In particular, but not exclusively, the present invention relates to a method of receiving a signal containing information in dependence on the frequency or a frequency related characteristic.

BACKGROUND TO THE INVENTION

Wireless communication systems are known. One known system is illustrated schematically in FIG. 1. The area covered by a wireless communication network 2 is divided into a number of cells 4. The cells may be side by side and/or overlapping. Each cell 4 is provided with a base station 6. Each base station 6 is arranged to communicate with mobile stations 8 or other user equipment located in the cells.

Figure 1:
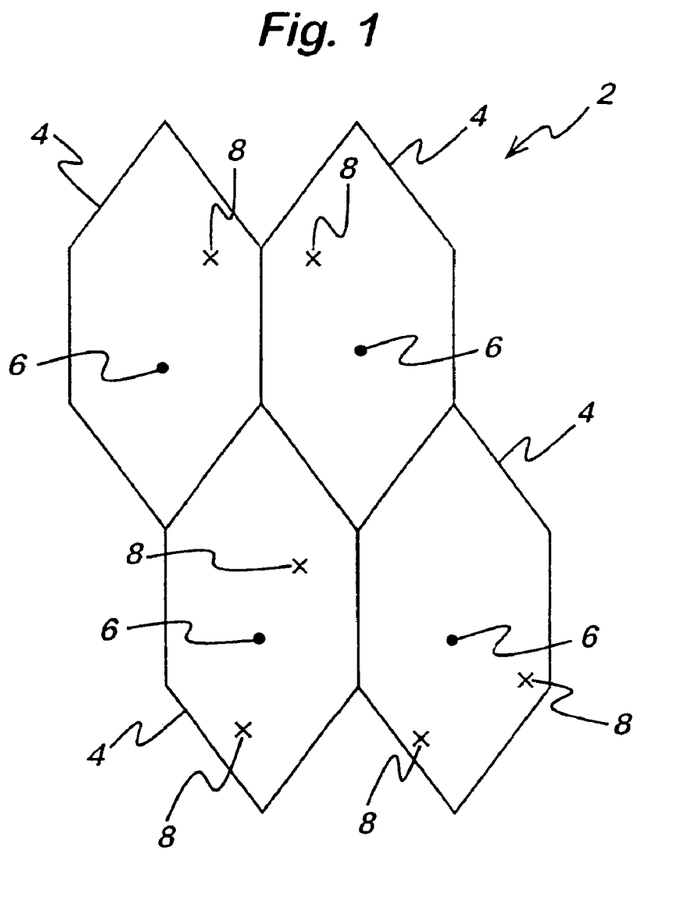
FIG. 1 shows a schematic view of a network.

A number of different standards are known which regulate the communication between the base stations and the mobile stations. One commonly used standard is the GSM (Global System for Mobile Communications) standard. This is a digital communication system. In GSM, data is transferred between the mobile stations 8 and the base stations 6 as a radio signal over a physical channel which may use frequency and/or time division multiplexing to create a sequence of radio frequency channels and time slots. Each frequency band is divided into time division multiple access frames, with 8 users per frame. Each user is allocated time to send a single burst of information. Typically, the mobile station and base station which are in communication will use different frequency bands.

GSM can, in some implementations, use GMSK (Gaussian Minimum Shift Keying) modulation. GMSK modulation uses the phase of the radio signal in order to transmit the data. The phase of the signal is of course dependent on the frequency of the signal. In order to correctly identify the transmitted data, the frequency of the signal received at the receiving one of the base station and the mobile station should be within defined limits as compared to the intended frequency of transmission of that signal. If the frequency has shifted beyond these limits, then errors in the recovery of the data may occur.

Errors in the frequency at the receiving one of the mobile station and base station can occur for a number of reasons. For example, this can occur if one of the mobile station and the base station is moving. Usually, of course, the mobile station will move. Changes in the frequency can of course occur due to the Doppler shift. This effect is particularly marked when the mobile station is moving relatively fast. For example, high speed trains having a speed of around 330 km/hour are being proposed. At those speeds, the Doppler shift introduced by the movement of the mobile station would result in a relatively large frequency change. It should of course also be noted that movement at slower speeds will also result in Doppler shifts.

Movement of the mobile station relative the base station is not the only source of frequency changes. Other errors may be introduced. For example, multi-path propagation may change the frequency of the signal received. The oscillator of the transmitter may not be working correctly, for example due to changes in temperature, and accordingly the transmitted signal and hence the received signal are not at the correct frequency. Additionally, adverse weather conditions particularly very hot or very cold weather can change the condition of the radio channel which results again in a frequency shift of the received radio signals. In general, the changes in frequency are introduced either by radio frequency impairments or change in channel characteristics. The radio frequency impairments include multi-path propagation, and variation in the crystal oscillator characteristics. The change in channel characteristics include the effects due to movement and changes in weather conditions.

Generally, the GSM standard is reasonably robust. As such, it is able to cope with some variation in the frequency. However, errors from more than one source may be present which cumulatively provide a relatively large frequency error.

Additionally, very fast moving mobile stations can introduce a relatively large frequency shift on their own.

SUMMARY OF THE INVENTION

It is an aim of embodiments of the present invention to address one or more of the above-mentioned problems.

According to a first aspect of the present invention there is provided a receiver for receiving transmitted signals, each transmitted signal containing at least two known portions which are spaced from one another in said signal and at least one other portion, said receiver comprising channel estimation means for estimating a channel based on at least one of said known portions, and means for using said channel estimate and at least two of said known portions to determine a characteristic of said channel.

According to a second aspect of the present invention there is provided a receiver for receiving transmitted signals, said receiver comprising frequency correction means for correcting for frequency errors in the received signals, said frequency correction means comprising a first frequency estimator arranged to calculate a first estimated error, taking into account only a current signal, and a second frequency estimator arranged to calculate a second estimated error taking into account a plurality of received signals.

According to a third aspect of the present invention there is provided a receiver for receiving transmitted signals, said receiver comprising frequency correction means for correcting for frequency errors in the received signals, said frequency correction means comprising a first frequency estimator arranged to calculate a first estimated error, taking into account only a current signal, and a second frequency estimator arranged to calculate a second estimated error taking into account a plurality of received signals.

BRIEF DESCRIPTION OF THE DRAWINGS

For a better understanding of the present invention and as to how the same may be carried into effect, reference will now be made by way of example to the accompanying drawings in which.

DETAILED DESCRIPTION OF EMBODIMENTS OF THE PRESENT INVENTION

Figure 2:
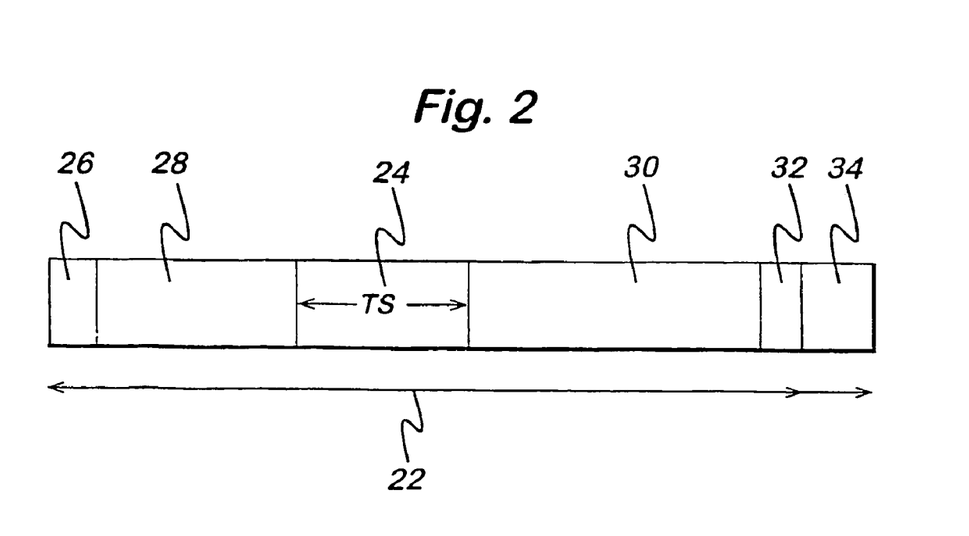
FIG. 2 shows a diagrammatic representation of a burst in the GSM standard.

Reference will first be made to FIG. 2 which shows a diagrammatic representation of a GSM burst. In the GSM standard, the GMSK modulated data is formed into a burst containing a sequence of 156.25 complex symbols. Each symbol has a real part and an imaginary part. 156.25 symbols is the number of symbols that can fit into a single time slot. The burst 22 has six components. A first "tail bits" field 26 is provided. This first tail bit field 26 comprises three symbols. Next is a first set of encrypted data 28. This consists of fifty-eighty symbols. This is followed by a training sequence 24 which is twenty-six symbols in length. The training sequence is known in advance by the receiver. This is known as a mid-amble as it comes between two data fields. The training sequence 24 is followed by a second data set 30 which again comprises fifty-eight symbols of encrypted data. Finally, this is followed by a second "tail bits" field 32 which comprises three symbols. At the end of the burst is a guard period 34, which is empty and which extends for a period equivalent to 8.25 symbols.

In the GMSK modulation scheme, a symbol is equivalent to a bit so there are one hundred and forty eight bits in a burst.

As is known, the training sequence symbols 24 are known to the receiver in advance. The data symbols are of course not known.

As discussed previously, the frequency of a burst received by the receiving one of the mobile station and the base station frequently varies from the intended frequency of transmission of the burst by a certain amount of "frequency offset". This frequency offset has the consequence that the phase of the signal changes with time.

Embodiments of the present invention are able to counter-act the Doppler spread of the frequency introduced by the use of a mobile station on a high speed train. By way of example, these high speed trains may be moving at velocities up to 330 km/hour. With the increased Doppler spread, without embodiments of the present invention, the quality of the signal would be reduced. Quality can be measured in terms of bit error rate. Embodiments of the present invention are arranged to achieve an average received quality level—4 or better. This is to ensure successful call set up and hand off. Received quality levels—4 is also known as RXQUAL-4, is a raw bit error rate measurement that falls within 1.6 to 3.2%.

$$\left(\text{Raw } BER = \frac{\text{No of Bits in Error}}{\text{Total number of Bits sent}} \times 100\%\right)$$

For successful operation, this level has to be reached before any energy per bit divided by the noise is equal to 20 dB. It should be appreciated that whilst some embodiments of the present invention seek to achieve this criteria, other embodiments of the present invention may have a higher or lower quality requirements. Embodiments of the present invention are able to mitigate the effects of frequency change, regardless of the cause of that frequency change.

Before describing the embodiment of the present invention in detail, it is believed that it will assist in the understanding of the present invention if the background to the invention is described in more detail.

In one known approach, the frequency $\hat{\omega}_{lmmse}$ is estimated from received and reference values computed using the twenty-six training symbols and five channel impulse response taps. In general terms the received training sequence symbols are compared to the reference training sequence symbols. The received and reference symbols should be the same in an ideal environment. The difference provides information on the characteristics of the channel.

$$\hat{\omega}_{lmmse} = -\frac{\sum_{n=64}^{87} r_n \, \text{Im}\{a_n^* z_n\}}{\sum_{n=64}^{87} r_n^2 |a_n|^2 + \frac{\sigma_w^2}{\sigma_\omega^2}} \quad (1)$$

where:
$z_n$ are the received samples,
$r_n \equiv (n - N/2)$ are pure real constants,
$\sigma_w^2$ is the estimate of the noise variance,
$\sigma_\omega^2$ is the variance of the true frequency offset,
N denotes the number of received symbols and finally,
$a_n$ represents reference values calculated by the following equation:

$$a_n = \sum_{k=0}^{L} h_k s_{n-k} \quad n = 64 \ldots 87 \quad (2)$$

where:
$h_k$ represents channel impulse response,
$s_{n-k}$ denotes the transmitted training symbols and
L represents the number of channel taps.

The number of channel taps used may be 5.

Figure 6:
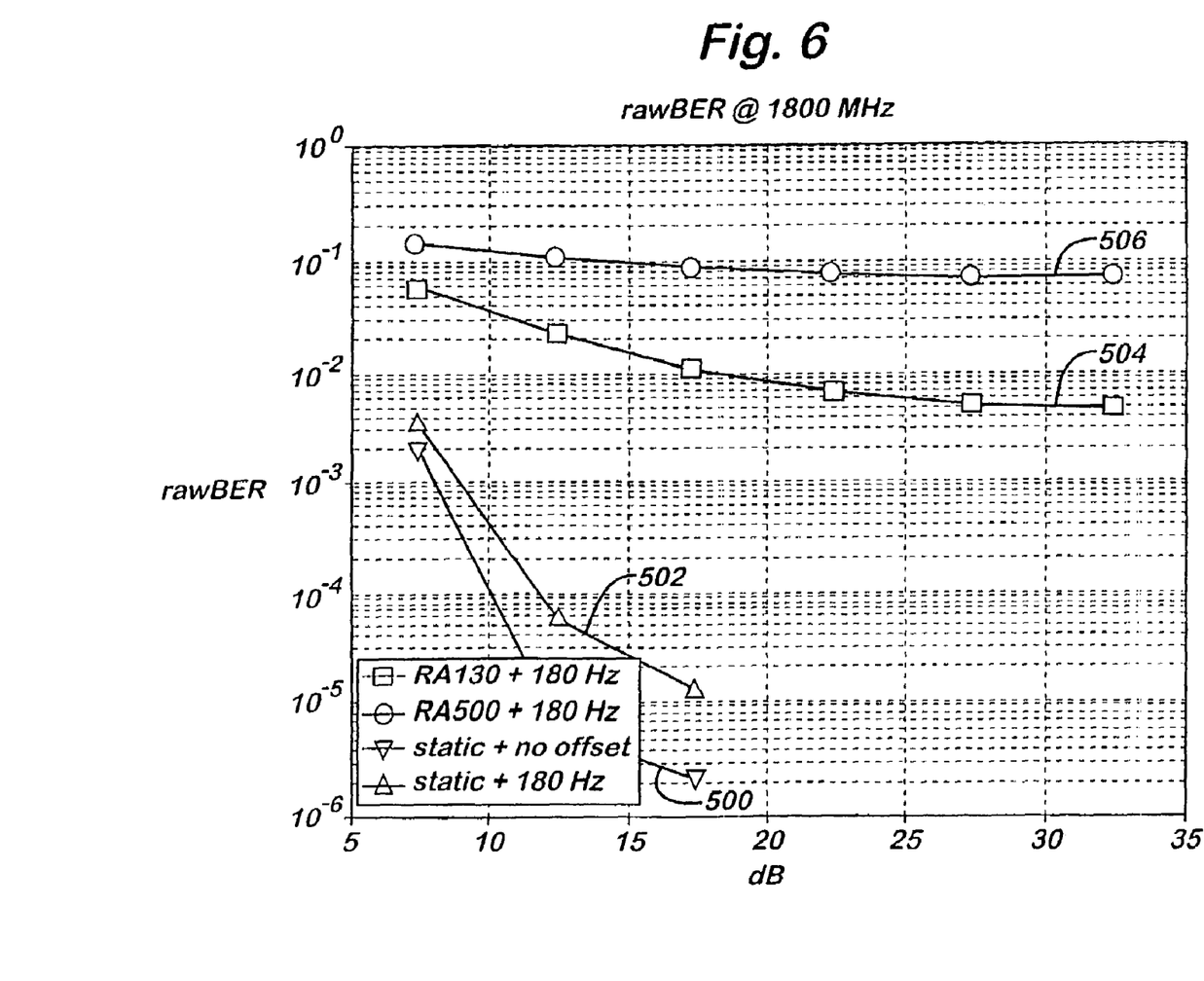
FIG. 6 shows a graph illustrating the performance of the received signal form mobiles moving at different speeds and in different propagation conditions, when using a previously proposed method.

Reference is made to FIG. 6 which shows the raw bit rate performance. These are simulated results and the graph of FIG. 6 shows the performance of the receiver for a received signal from mobile stations moving at high speed and through different propagation conditions. Raw bit error rate is plotted against noise. In the test illustrated by the results of FIG. 6, a frequency of the order of 1800 MHz is used, this being one of the GSM frequency ranges. The line 500 with the triangles, apex downwards, shows the results when the mobile station is assumed to be stationary and there is no frequency offset. The line 502 with the triangles with the apex pointing upwardly shows the results when the mobile station is assumed to be static and there is an offset of 180 Hz. As can be seen from FIG. 6, the 180 Hz offset means that the results provided are not as good as when there is no offset but are still within acceptable limits. Indeed, the results are well within the limits defined by the GSM standard.

FIG. 6 also shows how the performance of the system is degraded if the mobile station is moving. The line with the circles represents a combination of a RA 500 with an offset 180 Hz. RA is a rural area propagation model which introduces doppler shift depending on the speed. 500 is a speed of 500 Km/h. The line with the square brackets represents the results with an RA of 130 (rural area model with speed of 130 Km/h) with an offset of 180 Hz. This introduces a further frequency shift in addition to the 180 Hz shift. It should be appreciated that the offset of 180 Hz may be due to errors in the crystal oscillator or the like. In other words, the errors are capable of accumulating.

Figure 3:
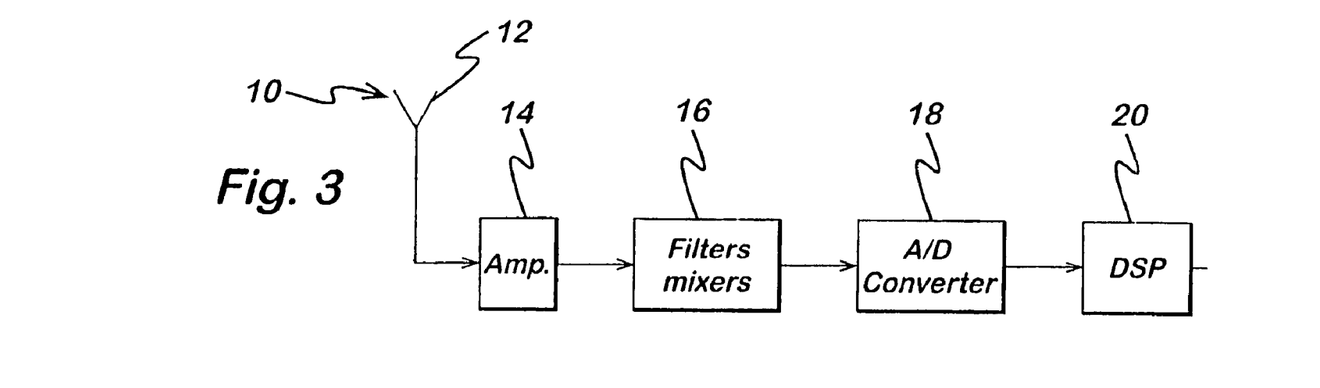
FIG. 3 shows the general structure of a receiver which can be used in embodiments of the present invention.

Reference will now be made to FIG. 3 which shows schematically a receiver embodying the present invention. This receiver may be incorporated in a mobile station or may be incorporated in a base station or both.

The transmitted bursts 22 are received by an antenna 12. The signal received by the antenna 12 is input to an amplifier 14 which amplifies that signal. The amplified signal is output by the amplifier 14 to filters and mixers 16. The filters and mixers have the effect of reducing signals which fall outside the frequency of interest and also reduce the signal to the base band frequency. The output of the filters and mixers 16 is input to an analogue to digital converter 18. The output of the filters and mixers 16 is an analogue signal. This is converted by the analogue to digital no converter 18 to a digital signal. The digital signal is input to a digital signal processor. Embodiments of the present invention are preferably carried out in the digital signal processor or at least in the digital domain. However, alternative embodiments of the present invention could conceivably be carried out in the analogue domain.

In embodiments of the present invention an enhanced burst-by-burst automatic frequency correction mechanism is used. This is in addition to frequency tracking. It should be appreciated that some embodiments of the present invention may only use the enhanced burst-by-burst automatic frequency mechanism whilst other embodiments of the present invention may only use the frequency tracking. However, preferred embodiments of the present invention will use both of these aspects.

In general terms, the enhanced burst-by-burst automatic frequency correction uses the first and second tail bits as additional "training" symbols. Generally, the symbols of the first and second tail symbol fields are known to the receiver. Accordingly, the received tail symbols can be compared with the expected tail symbols.

It should be appreciated that the performance is improved firstly because more symbols are used. However, because the symbols are spaced apart from the training symbols, a further improvement in the performance can be obtained. The advantage of using the tail symbol fields is that embodiments of the present invention can easily be used with the GSM standard without requiring any modification to that standard or of the information which is transmitted. However, it should be appreciated that in different contexts, having two or more sets of training symbols within a burst, which are spaced apart from one another may also provide an improvement over the prior art. It should also be appreciated that in some embodiments of the present invention, only one of the two tail symbol fields may be considered.

In the GSM standard, the known symbols are referred to as the training sequence. Different standards may used different terminology to refer to the reference or known symbols. Embodiments of the present invention are applicable to any reference or known symbols.

The frequency tracking used by embodiments of the present invention is implemented by a tracking algorithm. The tracking algorithm aims to remove the average frequency offset and also helps the burst-by-burst automatic frequency correction by improving the accuracy. This will now be described in more detail hereinafter.

Figure 4:
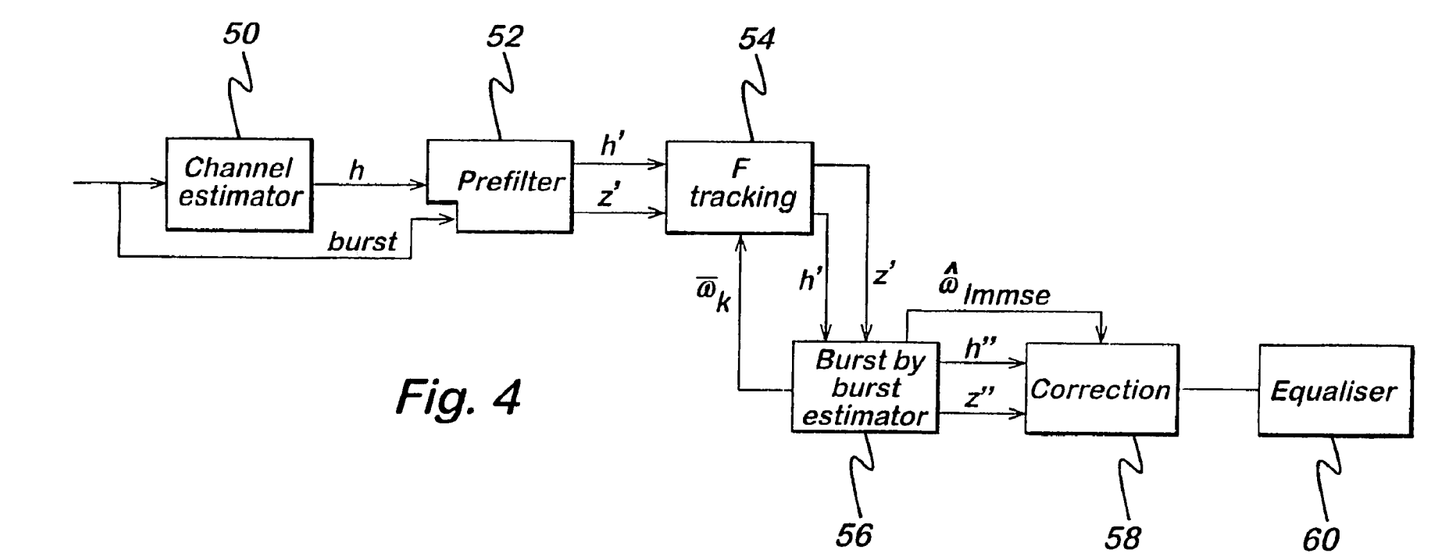
FIG. 4 shows part of the receiver of FIG. 3 in more detail.

Reference is made to FIG. 4 which shows a block diagram of part of the digital signal processor 20 of FIG. 3 in more detail.

The digital output of the analogue to digital converter, representing the received burst is input to a channel estimator 50. The channel estimator is arranged to calculate the channel impulse response h. The channel impulse response h is calculated for the training sequence. This provides five taps. The output of the channel estimator is input to a pre-filter 52. In addition to the channel impulse response h, the pre-filter 52 also receives the incoming burst z. The pre-filter 52 is arranged to prefilter the received signal so that it is modified to a minimum phase channel, that is the energy of the channel is concentrated in a relatively few taps, for example the first three taps. The pre-filter 52 calculates prefilter coefficients from the impulse response and the noise variance of the received signal. The noise variance is calculated from the received signal and the initial impulse response input to the prefilter.

The received signal input to the prefilter is filtered by the prefilter in accordance with the calculated prefilter coefficients to provide a modified signal Z'. The calculation for the prefilter taps also provides a modified impulse response h' which is output by the prefilter.

Figure 5:
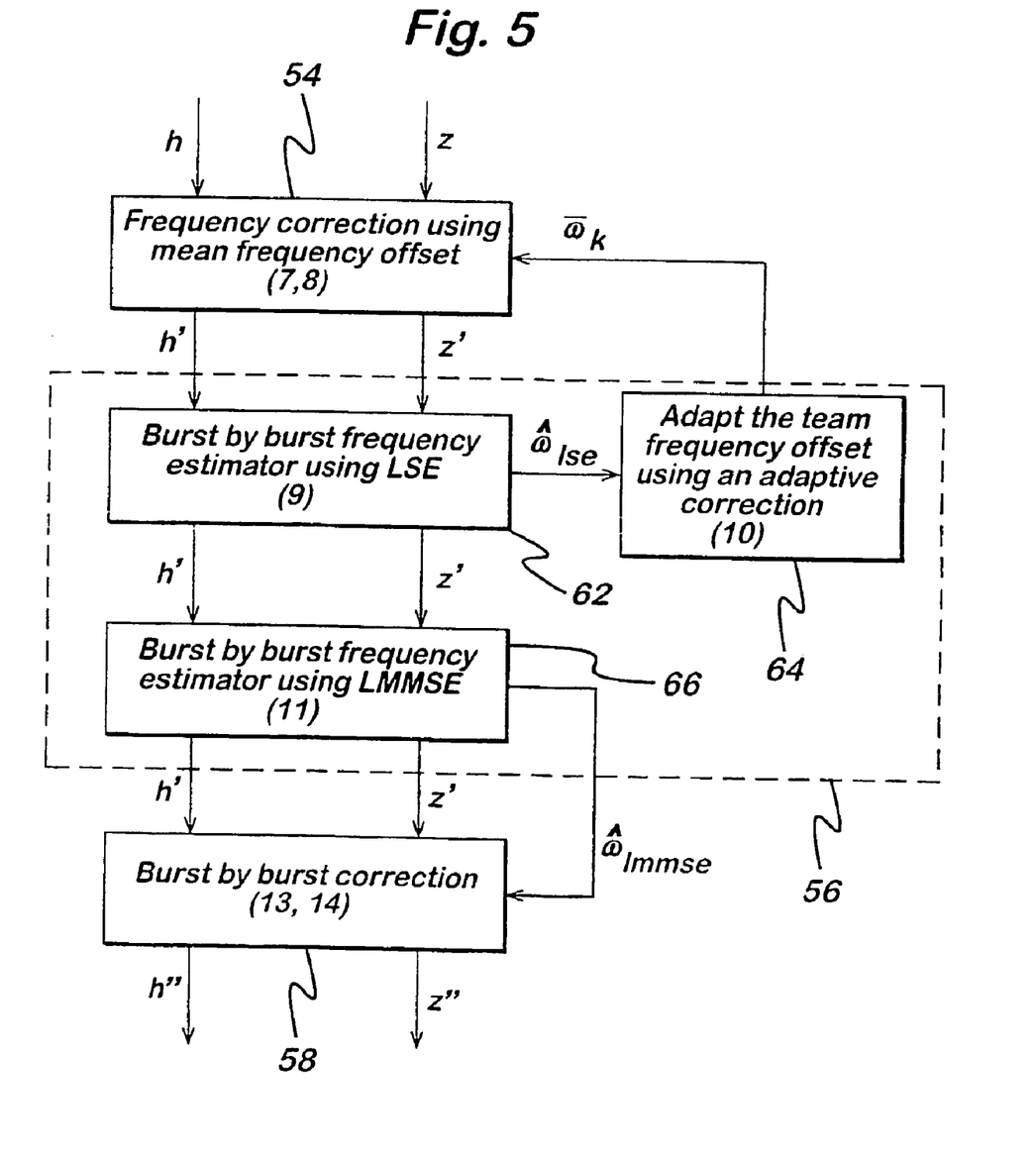
FIG. 5 shows a flow chart of the steps carried out in embodiments of the present invention.

The output of the pre-filter is input to the frequency tracking unit 54. The output of the frequency tracking unit 54 is input to a burst-by-burst estimator 56 which in turn provides an output to a frequency correction unit 58. The burst-by-burst estimator 56 also provides an output to the frequency tracking unit 54 and a further output to the correction unit 58. The blocks 54 to 58 are shown in further detail in FIG. 5. Firstly, the frequency tracking block 54 receives the modified channel impulse response output and the prefiltered burst output from the pre-filter 52. The frequency tracking unit 54 applies a frequency correction using a mean frequency offset calculated in the burst-by-burst estimator 56. The outputs provided by the frequency tracker 54 are represented by equations (A) and (B). $z'_n$ is the modified burst and $h'_k$ is the modified channel impulse response. Thus the frequency tracking unit effectively removes the mean frequency offset from the signals input to the frequency tracking unit.

$$z'_n = z_n e^{-j\bar{\omega}_k(n-N/2)} n=\{0,1,\ldots N-1\} \qquad (A)$$

and $$h'_k = h_k e^{-j\bar{\omega}_k(n-L/2)} k=\{0,1,\ldots L-1\} \qquad (B)$$

where $\bar{\omega}_k$ represents mean frequency offset estimated via an adaptive algorithm, N denotes the total number of received symbols and L represents the number of channel taps (L=5 in this embodiment).

The function provided by the burst-by-burst estimator 60 can be considered as been made up of three separate blocks. The first is a burst-by-burst frequency estimator 62. The burst-by-burst frequency estimator 62 uses the least square estimation technique. Thus, once the mean has been removed from the signal, the burst frequency error is estimated using the least square estimation method in order to obtain unbiased estimates for updating the mean offset. The equation for estimating the frequency error using the least square estimation method is as shown in equation (C).

$$\hat{\omega}_{lse} = -\frac{\sum_{n=64}^{87} r_n \text{Im}\{a_n^* z'_n\}}{\sum_{n=64}^{87} r_n^2 |a_n|^2} \qquad (C)$$

where $a_n = \sum_{k=0}^{} h_k s_{-n-k}$ \qquad (J)

$s_{n-k}$ are the known symbols. This is the training sequence. In preferred embodiments of the present invention, this can also include either or both of the tail fields which contain known symbols. The tail symbols can be used because the modified taps provided by the prefilter are such that the energy of the channel is concentrated into the first three taps. In order for any meaningful result to be obtained, the number of taps should be less than or equal to the number of symbols. In this example, the energy is concentrated in three (or less) taps and the number of symbols is three. r are real constants.

The output of the burst-by-burst frequency estimator 62 is input to a block 64 which adapts the mean frequency offset to take into account the newly calculated burst frequency error.

An adaptive constant μ is used. Block 64 uses the following equation:

$$\overline{\omega}_{k+1} = \overline{\omega}_k + \mu \hat{\omega}_{lse} \quad (D)$$

where $\overline{\omega}_{k+1}$ represents the new value, $\overline{\omega}_k$ denotes the previous value, $\hat{\omega}_{lse}$ represents the LSE estimates computed after mean has been removed from the signal and μ represents the adaptive constant.

μ is set to any appropriate value and can be set using trial and error. In one embodiment of the present invention, μ was set to have a reasonably moderate level, for example 0.008. This provides reasonable accuracy and speed. The updated mean is then output to the frequency correction block 54 which uses the updated mean for the next burst of data.

The burst-by-burst estimator also includes a second burst-by-burst frequency estimator 66. The second burst-by-burst frequency estimator uses the linear minimum mean square error. This is used to provide an output which can remove burst errors. Thus, the second burst-by-burst frequency estimator provides an estimate of the $\hat{\omega}_{lmmse}$ using the following equation:

$$\hat{\omega}_{lmmse} = -\frac{\sum_{n=64}^{87} r_n \operatorname{Im}\{a_n'^* z_n'\}}{\sum_{n=64}^{87} r_n^2 |a_n'|^2 + \frac{\sigma_w'^2}{\sigma_\omega^2}} \quad (E)$$

where $$a_n' = \sum_{k=0}^{L} h_k' s_{n-k} \quad n = 64 \ldots 87$$

and $\sigma_w'^2$ is the noise estimate after mean frequency offset has been removed from the signals. In the same way as described in relation to the first burst-by-burst estimator, the known symbols $S_n$ can be just the training sequence or the training sequence and either or both of the symbols of two tail fields.

This is output to the burst-by-burst correction unit 58. It should be appreciated that in embodiments of the present invention, the frequency tracking unit 54, the first and second burst-by-burst frequency estimators 62 and 66 and the burst-by-burst correction unit 58 all receive the values of the channel impulse response and the burst output provided by the pre-filter 52. The burst-by-burst correction unit 58 uses the estimate provided by the second burst-by-burst frequency estimator 66 to remove the burst errors. Thus, the signal and channel taps are de-rotated in accordance with equations F and G.

$$z''_n = z'_n e^{-j\hat{\omega}_{lmmse}(n-N/2)} \quad n=\{0,1,\ldots N-1\} \quad (F)$$

$$h''_k = h'_k e^{-j\hat{\omega}_{lmmse}(k-L/2)} \quad k=\{0,1,\ldots L-1\} \quad (G)$$

The de-rotated signal and channel taps are then output the equaliser where they can be processed in the normal way. In particular the information contained in the data fields of the burst can be processed further.

Figure 7:
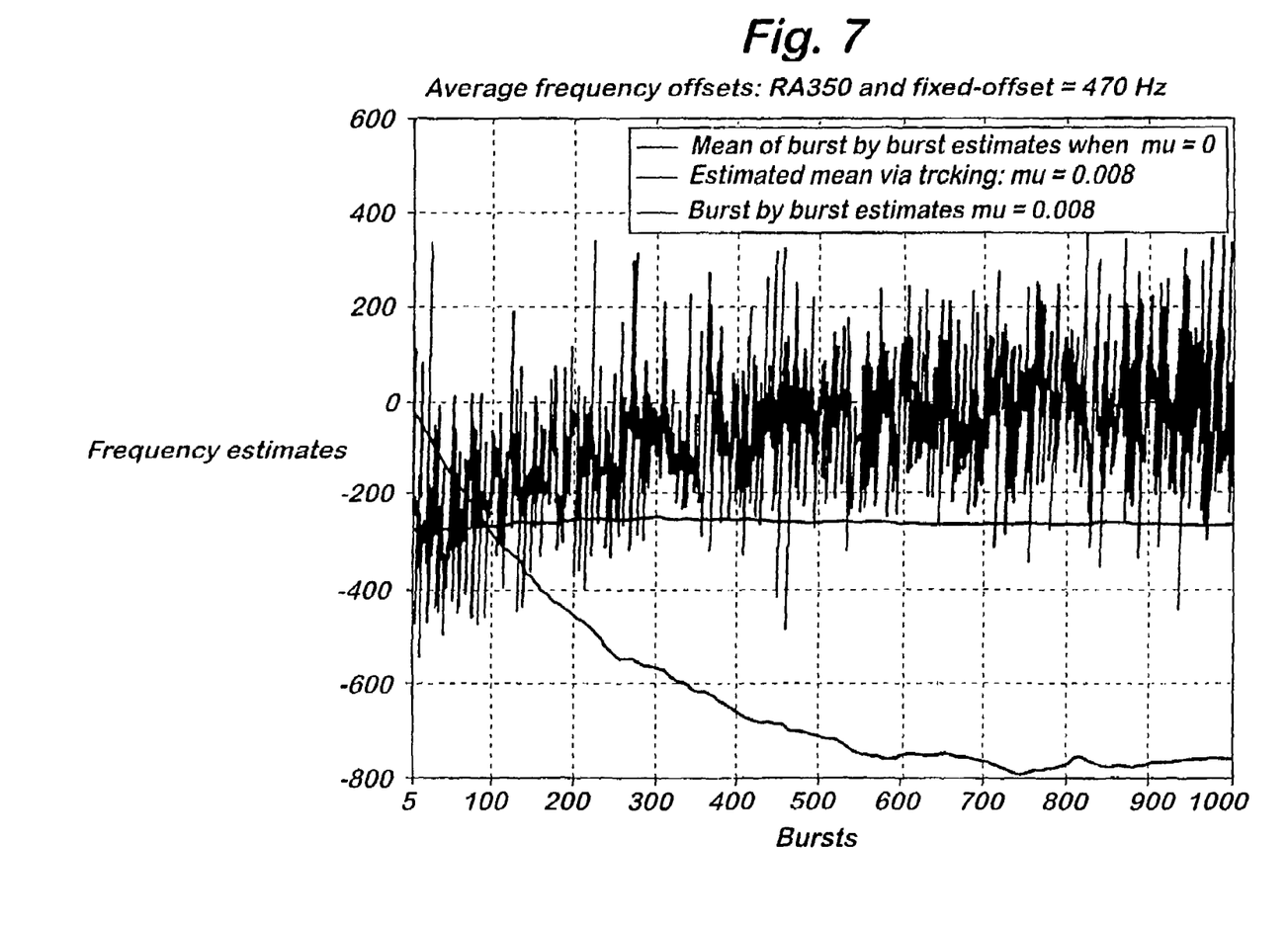
FIG. 7 shows frequency offset estimates against bursts.

Reference is made to FIG. 7 which shows frequency offset estimates against burst. As can be seen after six hundred bursts the mean of the burst errors approaches zero.

Figure 8:
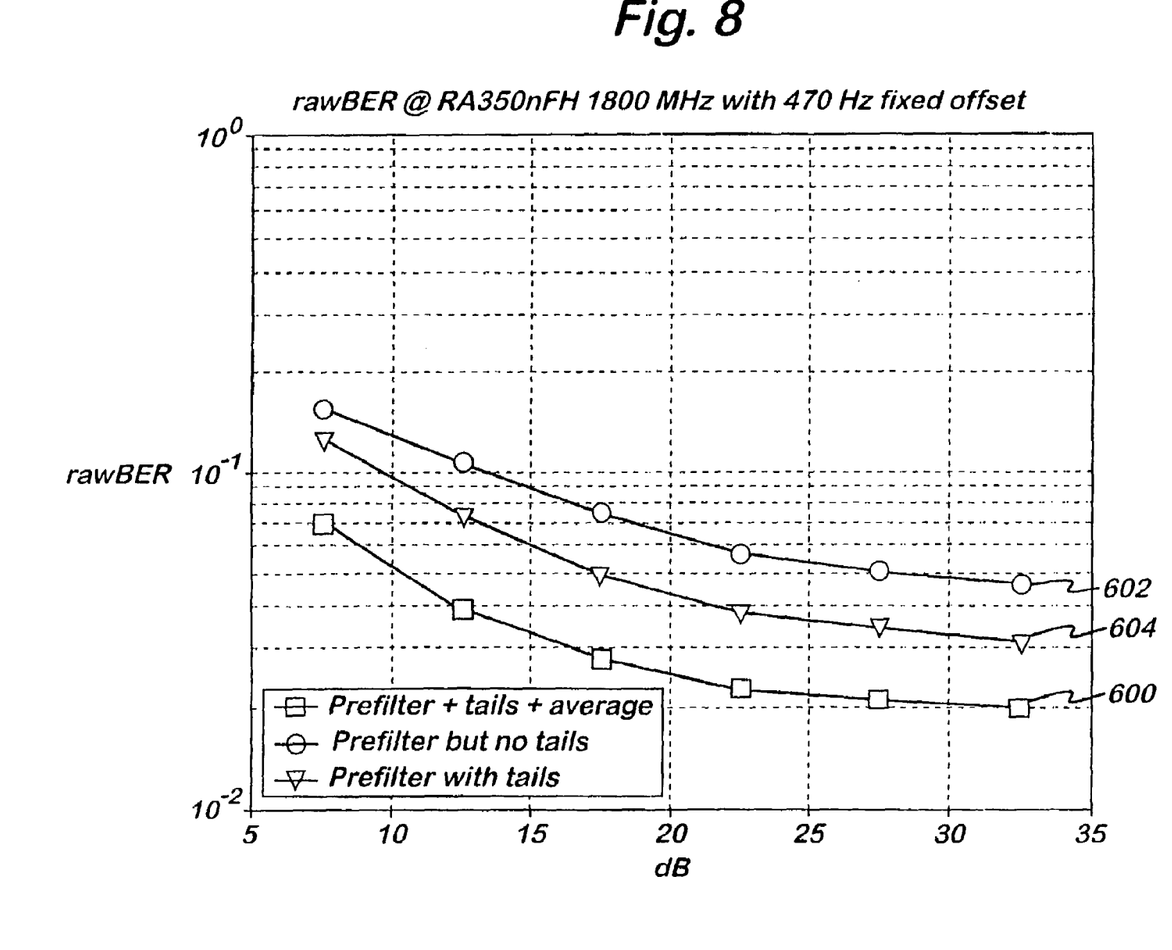
FIG. 8 shows raw bit error rate performance of a modelled embodiment of the present invention.

Reference is made to FIG. 8 which shows raw bit error rate against noise assuming a 470 Hz fixed frequency offset. The line 600 with the squares represents the pre-filtering with tail fields and the frequency tracking embodying the present invention. The line 602 with the circle represents pre-filtering, without using the tail fields. The line 604 with the triangles represents a pre-filtering with the use of the tails. As can be seen, use of pre-filtering with the tail sections of the bursts improves the performance. However, the performance is further improved if the frequency tracking embodying the present invention is also used.

Embodiments of the present invention are preferably incorporated in a base station. However embodiments of the present invention may alternatively or additionally be provided in a mobile station or other suitable user equipment.

The preferred embodiment of the present invention has been described in the context of a GSM system using GMSK modulation. It should be appreciated that in alternative embodiments of the present invention can be used with different modulation methods which are reliant of frequency or a frequency dependent characteristic. Embodiments of the present invention can of course be used with any other standard or communication method where the modulation used is at least dependent on the frequency. Embodiments of the present invention are not just applicable to wireless cellular communication systems but be used in any arrangement where signals are transferred using a modulated radio or the like signal.

The invention claimed is:

1. An apparatus, comprising:
a channel estimator configured to estimate a channel based on at least one known portion of a transmitted burst, said transmitted burst comprising a data sequence comprising at least two known portions which are spaced apart from one another in said transmitted burst, and at least one other portion; and
an estimator configured to use said channel estimate and at least two of said known portions to perform determining of a frequency characteristic of said channel, the determining comprising comparing at least two of said known portions with reference values.

2. The apparatus as claimed in claim 1, wherein at least one of said known portions is in a middle region of said transmitted burst.

3. The apparatus as claimed in claim 1, wherein at least one of said known portions is at an end region of said transmitted burst.

4. The apparatus as claimed in claim 1, wherein said transmitted burst is a global system for mobile communications burst.

5. The apparatus as claimed in claim 4, wherein at least one of said known portions comprises a training sequence.

6. The apparatus as claimed in claim 4, wherein at least one of said known portions comprises tail symbols.

7. The apparatus as claimed in claim 1, wherein said transmitted burst is modulated in accordance with a modulation method dependent on a frequency related characteristic.

8. The apparatus as claimed in claim 1, wherein said transmitted burst is modulated in accordance with a Gaussian minimum shift keying modulation method.

9. The apparatus as claimed in claim 1, further comprising: a pre-filter configured to modify said transmitted burst so as to have a minimum phase.

10. The apparatus as claimed in claim 1, wherein said pre-filter is further configured to modify n input channel estimates determined from a burst to concentrate an energy thereof in m estimates, where m is less than n.

11. The apparatus as claimed in claim 1, wherein a frequency tracking element is provided to correct an error in a frequency of a received burst.

12. The apparatus as claim in claim 11, further comprising a burst-by-burst estimator configured to calculate a mean frequency offset, wherein said mean frequency offset is calculated using said estimated channel and at least two of said known portions.

13. The apparatus as claimed in claim 11, further comprising a burst-by-burst estimator configured to calculate a mean frequency offset from a plurality of said transmitted burst using a least square estimation method.

14. The apparatus as claimed in claim 12, wherein said frequency tracking element is configured to frequency correct said received burst using said mean frequency offset.

15. The apparatus as claimed in claim 11, wherein said frequency tracking element is configured to estimate an error for said burst based on said burst only and to correct said burst based on said estimated error using a linear minimum square error method.

16. An apparatus, comprising:
channel estimation means for estimating a channel based on at least one known portion of a transmitted burst, said transmitted burst comprising a data sequence comprising at least two known portions which are spaced apart from one another in said transmitted burst, and at least one other portion; and
means for using said channel estimate and at least two of said known portions to perform determining of a frequency characteristic of said channel, the determining comprising comparing at least two of said known portions with reference values.

17. A method, comprising:
receiving a transmitted burst, the burst comprising a data sequence comprising at least two known portions which are spaced apart from one another in the data sequence, and at least one other portion;
estimating a channel based on at least one of said two known portions; and
determining a frequency characteristic of the channel using the channel estimate and at least two of said known portions, the determining comprising comparing at least two of said known portions with reference values.

18. A computer program product embodied on a computer readable storage medium, the computer program product being configured to control a processor to perform a method, the method comprising:
receiving a transmitted burst, wherein the burst comprises a data sequence comprising at least two known portions configured to be spaced apart from one another in the data sequence, and at least one other portion;
estimating a channel based on at least one of said two known portions; and
determining a frequency characteristic of the channel using the channel estimate and at least two of said known portions, the determining comprising comparing at least two of said known portions with reference values.

19. An apparatus, comprising:
a frequency correction element configured to correct frequency errors in received transmitted signals, said frequency correction element comprising
a first frequency estimator configured to calculate a first estimated error, taking into account only a current signal; and
a second frequency estimator configured to calculate a second estimated error taking into account the first estimated error and a plurality of received transmitted signals received previous to the current signal to correct the frequency errors in the received transmitted signals.

20. The apparatus as claimed in claim 19, wherein at least one of said first frequency estimator and said second frequency estimator is configured to calculate an estimated error for each received transmitted signal.

21. The apparatus as claimed in claim 19, wherein said first frequency estimator is arranged to use a linear minimum mean square method.

22. The apparatus as claimed in claim 21, wherein said linear minimum mean square error method uses the following equation:

$$\hat{\omega}_{lmmse} = -\frac{\sum_{n=64}^{87} r_n \operatorname{Im}\{a_n'^* z_n'\}}{\sum_{n=64}^{87} r_n^2 |a_n'|^2 + \frac{\sigma_w'^2}{\sigma_\omega^2}} \quad (E)$$

where $$a_n' = \sum_{k=0}^{L} h_k' s_{n-k}$$

$\sigma_w'^2$ is the noise estimate
r are constants
$S_{n-k}$ are known symbols.

23. The apparatus as claimed in claim 19, wherein said second frequency estimator is configured to use a least mean square estimate.

24. The apparatus as claimed in claim 23, wherein said second frequency estimator is configured to use the following equation:

$$\hat{\omega}_{lse} = -\frac{\sum_{n=64}^{87} r_n \operatorname{Im}\{a_n^* z_n'\}}{\sum_{n=64}^{87} r_n^2 |a_n|^2} \quad (C)$$

where $a_n = \Sigma h_k S_{-n-k}$ \quad (J)

$s_{n-k}$ are known symbols
r are constants.

25. The apparatus as claimed in claim 19 incorporated in a mobile station or a base station.

* * * * *